United States Patent [19]

Schaty

[11] Patent Number: 5,098,242
[45] Date of Patent: Mar. 24, 1992

[54] PLASTIC FASTENER FOR THREADED STUD

[75] Inventor: Harald Schaty, Wetzlar, Fed. Rep. of Germany

[73] Assignee: Emhart Inc., Newark, Del.

[21] Appl. No.: 727,966

[22] Filed: Jul. 10, 1991

[51] Int. Cl.$^5$ ............................................. F16B 37/16
[52] U.S. Cl. ................................... 411/437; 411/339; 411/512; 411/908; 411/433
[58] Field of Search ............... 411/433, 437, 508–510, 411/512, 338, 339, 908, 55, 60

[56] References Cited

U.S. PATENT DOCUMENTS

| | | | |
|---|---|---|---|
| 4,367,995 | 1/1983 | Mizusawa et al. | 411/437 |
| 4,541,153 | 9/1985 | Schaty | 411/908 |
| 4,579,493 | 4/1986 | Schaty | 411/437 |
| 4,610,587 | 9/1986 | Wollar et al. | 411/60 |
| 4,728,236 | 3/1988 | Kraus | 411/437 |
| 4,859,129 | 8/1989 | Kraus | 411/512 |
| 4,999,019 | 3/1991 | Kraus | 411/437 |

*Primary Examiner*—Neill R. Wilson
*Attorney, Agent, or Firm*—Spencer T. Smith

[57] ABSTRACT

A plastic hex shaped tubular fastener which is to be secured to a threaded stud. A plurality of spaced flexible tongues which project radially inwardly near the bottom of the body locate within the screw of the stud when pushed on the stud and when so located projecting cams carried on vertical ribs spaced from the tongues locate within the screw thread so that the fastener can then be screwed tight.

3 Claims, 1 Drawing Sheet

PLASTIC FASTENER FOR THREADED STUD

BACKGROUND OF THE INVENTION

The invention relates to a device for fastening two components to one another, one of which has the form of a plate to which a threaded stud is attached which can pass through the second component and onto which stud a tubular body can be screwed after the two components have been positioned together.

It is known with such devices to use plastics nuts which are provided, in the region of the end turned toward rhe components to be fixed to one another, with resilient tongues which serve to transmit torque onto the stud and which are inclined inwardly against the screw-tightening direction. With this known arrangement, however, there is a great danger that the flexible tongues cannot be screwed any further onto the stud, particularly if the two components to be joined together already lie on one another, because these tongues yield and can also damage the thread.

Accordingly, it is an object of the present invention to construct a device of the type outlined in the above, such that a tubular body adapted to co-operate with the stud, even after secure tightening, that is after the two components which are to be joined together come into contact, can reliably transmit torque to the stud and therefore provide a very secure hold, the resilient tongues merely having a positioning function.

BRIEF DESCRIPTION OF THE INVENTION

According to the invention, this object is achieved in that the tubular body has, in addition to resilient tongues which are spaced apart round the periphery in the region of its end portion facing the component and engage the thread of the stud, at least three cam-like projections which are axially spaced from the tongues and are integral with the tubular body, their external contours corresponding to the thread depth of the stud and the projections engaging in the stud.

The fastener of the present invention has the advantage, on the one hand, that the stud does not necessarily have to be welded to a plate, but can also be pushed as a plastics body from below through the plate and then through a hole in the component to be fixed to rhe plate, whereupon the tubular body can simply be pressed onto the free end of the stud. The resilient tongues slide past the first screw threads and hold the tubular body in its starting position. A spanner, for example, can then be applied to the tubular body to screw the tubular body downwards until it makes contact, the cam-shaped projections engaging in the screw thread or threads and taking over the actual transmission of the torque in this case. As these projections are solid in construction and are provided on the internal wall of the tubular body so that they do not yield, there is a guarantee that they always engage with the thread of the stud and the two components are therefore pressed securely together. As the entire tubular body can be produced in one piece by injection moulding, no excessively expensive apparatus is required for producing it.

BRIEF DESCRIPTION OF THE DRAWINGS

A preferred embodiment of the invention will now be described in greater detail by way of example with reference to the accompanying drawings, in which.

DETAILED DESCRIPTION OF DRAWINGS AND PREFERRED EMBODIMENT

Figure 1:
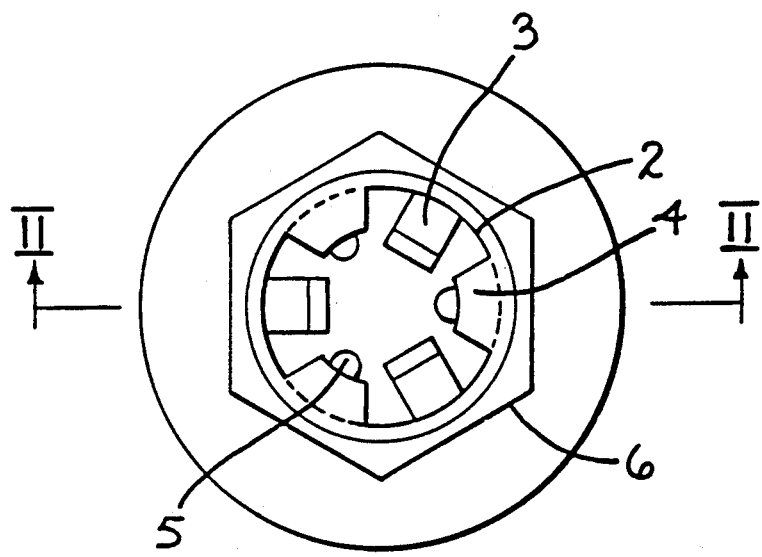
FIG. 1 shows a plan view of the tubular body.
Figure 2:
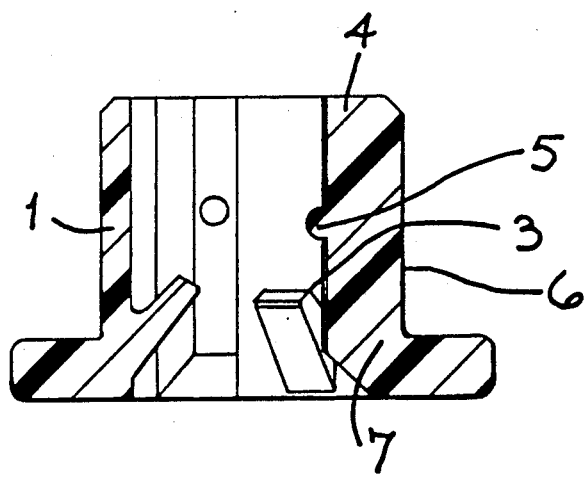
FIG. 2 shows a sectional view along the line II—II of FIG. 1.

The tubular body 1 (FIG. 2) serves, together with a stud 8, to fasten together the two adjacent components A, B. The stud can be welded on the plate-shaped substrate A or can extend through an orifice, the other component B to be secured on this substrate A being pushed over the stud 8 until it rests on the substrate B. The tubular body 1 is then pushed onto the stud which extends through the central orifice in the body 1, as indicated in FIG. 1, flexible tongues 3 being provided at the lower end portion of the internal wall of the tubular body 1. In the arrangement described, these tongues serve as means for the pre-positioning of the tubular body 1 on the stud, the tubular body 1 being pushed peripherally on the stud so that the resilient tongues yield and can slide over the individual screw threads of the stud. When no further pressure is exerted on the tubular body 1 in the direction of the components to be secured to one another, the tongues 3 engage in the external thread of the stud.

Webs 4, on whose end faces cam-like projections 5 are constructed, are also provided on the internal wall 2 of the tubular body, as shown in FIG. 1. These projections 5 are peripheral and do not lie in a place so they can engage in the screw threads of the stud. After the above-mentioned pre-positioning, a tool can be applied to the external periphery of the tubular body 1, which is hexagonal in the preferred embodiment, and the tubular body can be screwed onto the stud until the components A, B to be fixed on one another can be held in their final position. In this position, the tongues 3 cannot be used to transmit the torque because they escape from the screw threads of the stud owing to their flexibility and therefore lose their original screwing action. The projections 5, which then transmit the torque alone, are hemispherical in the embodiment illustrated, but they can also have any other cross-sectional profile providing that they effectively engage in the thread of the stud such, for example, as a truncated cone, optionally with a curved, internal edge. The webs 4 on which the projections 5 are provided are peripherally spaced from one another, are constructed between respectively adjacent tongues 3 and serve not only as reinforcement but also for effective engagement between the tubular body 1 and the stud 8 so that the components A, B to be fastened, of which, for example, the lower component A can be the body sheet of a motor vehicle while the other component B to be secured rhere can be a mounting for electric cables and the like, are rigidly joined together. The resilient tongues 3 inclined against the screwing-on direction of the tubular body 1 and also the projections 4 are arranged on the internal wall of the tubular body 1 such thar the tongues can initially engage in the thread of the stud while the projections 5 are permanently located in the thread.

In the embodiment illustrated, the tubular body 1 is constructed integrally with the above-mentioned other components and is composed of a suitable plastics material, for example POM.

Figure 3:
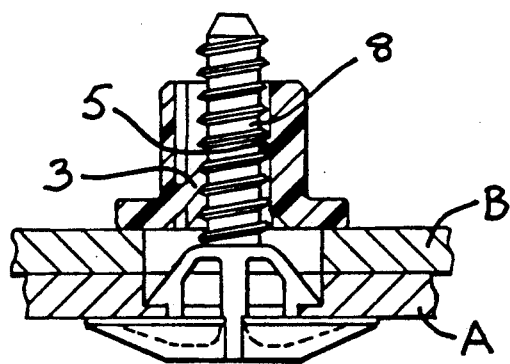
FIG. 3 shows a sectional view through an arrangement in which the tubular body rests on a stud and two components are fixed on one another.

FIG. 3 shows the arrangement when assembled. The stud, on which the tubular body 1 is screwed sufficiently far for the two components A, B to rest completely on one another, is pushed from below through a hole in the body sheet A and through another hole aligned therewith in component B.

More than one row of projections 5 may be provided, the rows being axially and radially spaced from one another.

Variations from the described embodiment can obviously be made without departing from the scope of the present invention.

I claim:

1. A plastic fastener for connection to a threaded stud comprising
   a hex shaped tubular body,
   a plurality of interior flexible annularly spaced tongues projecting upwardly proximate the bottom of said body for engaging the threads on the threaded shaft to prepositioning said body,
   a corresponding plurality of interior axially extending ribs located between and spaced from said tongues, said ribs extending substantially from the top to the bottom of said body,
   a cam like structure projecting radially inwardly from each of said ribs axially above said tongues, said cam like structures being selectively configured and located to engage the opposing sides of the thread of the prepositioned threaded stud so that said body can be threadedly tightened onto the threaded stud.

2. A plastic fastener according to claim 1, wherein said tongues project radially inwardly further then said ribs project radially inwardly.

3. A plastic fastener according to claim 2, wherein said cam like structures are hemispherical in shape.

* * * * *